US012567817B2

(12) United States Patent (10) Patent No.: US 12,567,817 B2

Sato (45) Date of Patent: Mar. 3, 2026

(54) ULTRASOUND PROBE AND ULTRASOUND ENDOSCOPE

(71) Applicant: OLYMPUS CORPORATION, Tokyo (JP)

(72) Inventor: Yoshiharu Sato, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 895 days.

(21) Appl. No.: 17/870,106

(22) Filed: Jul. 21, 2022

(65) Prior Publication Data

US 2022/0354458 A1 Nov. 10, 2022

Related U.S. Application Data

(63) Continuation of application No. PCT/JP2020/008502, filed on Feb. 28, 2020.

(51) Int. Cl.
*H02N 2/00* (2006.01)

(52) U.S. Cl.
CPC ..................................... *H02N 2/00* (2013.01)

(58) Field of Classification Search
CPC ...................................................... H02N 2/00
See application file for complete search history.

(56) References Cited

U.S. PATENT DOCUMENTS

| 4,087,716 A | * | 5/1978 | Heywang | .............. | H10N 30/50 |
| | | | | | 310/332 |
| 4,456,394 A | * | 6/1984 | Kolm | ................ | H10N 30/2043 |
| | | | | | 310/357 |

| 4,491,761 A | * | 1/1985 | Grudkowski | ........ | H10N 30/206 |
| | | | | | 310/358 |
| 5,034,649 A | * | 7/1991 | Chida | ................ | H10N 30/2042 |
| | | | | | 310/366 |
| 5,118,982 A | * | 6/1992 | Inoue | ..................... | H03H 9/581 |
| | | | | | 310/366 |
| 5,233,256 A | * | 8/1993 | Hayashi | ................. | H10N 30/50 |
| | | | | | 310/317 |
| 5,381,067 A | * | 1/1995 | Greenstein | ............ | B06B 1/0622 |
| | | | | | 310/326 |
| 5,410,205 A | * | 4/1995 | Gururaja | ............... | B06B 1/0614 |
| | | | | | 310/334 |

(Continued)

FOREIGN PATENT DOCUMENTS

| CN | 106903037 A | 6/2017 |
| JP | S60-162974 A | 8/1985 |

(Continued)

OTHER PUBLICATIONS

International Search Report dated Apr. 14, 2020 received in PCT/JP2020/008502.

*Primary Examiner* — Pedro J Cuevas

(74) *Attorney, Agent, or Firm* — Scully, Scott, Murphy & Presser, P.C.

(57) ABSTRACT

An ultrasound probe includes: an ultrasound transducer array in which a plurality of ultrasound transducers configured to transmit and receive ultrasound are arrayed; a backing layer provided on a proximal end surface of the ultrasound transducer array; and a piezoelectric element, provided on a proximal end surface of the backing layer, whose direction of polarization is opposite to a direction of polarization of the plurality of ultrasound transducers.

15 Claims, 10 Drawing Sheets

(56)                  References Cited

U.S. PATENT DOCUMENTS

| | | | | |
|---|---|---|---|---|
| 5,638,822 | A * | 6/1997 | Seyed-Bolorforosh | ...................... B06B 1/0607 600/459 |
| 5,834,879 | A * | 11/1998 | Watanabe | ............... D04B 15/78 310/330 |
| 6,822,374 | B1 * | 11/2004 | Smith | ..................... B06B 1/064 310/334 |
| 7,758,509 | B2 * | 7/2010 | Angelsen | ............ G01S 15/8925 600/447 |
| 8,575,823 | B2 * | 11/2013 | Nishikubo | ........... H10N 30/206 310/332 |
| 8,726,734 | B1 * | 5/2014 | Lin | ....................... B06B 1/0622 73/626 |
| 8,905,934 | B2 * | 12/2014 | Nishikubo | ............. H10N 30/50 600/443 |
| 9,308,554 | B2 * | 4/2016 | Campbell | ............. B06B 1/0614 |
| 9,728,710 | B2 * | 8/2017 | Noh | ........................ H10N 30/03 |
| 10,441,185 | B2 * | 10/2019 | Rogers | ................... A61B 5/287 |
| 10,680,162 | B2 * | 6/2020 | Pelssers | ............ A61M 25/0158 |
| 11,253,232 | B2 * | 2/2022 | Hakkens | ................. A61B 8/54 |
| 2003/0214379 | A1 * | 11/2003 | Satoh | ..................... A61B 8/145 336/200 |
| 2003/0216646 | A1 * | 11/2003 | Angelsen | ................. A61B 8/06 600/437 |
| 2012/0163126 | A1 * | 6/2012 | Campbell | ............. B06B 1/0614 367/137 |
| 2012/0256521 | A1 * | 10/2012 | Nishikubo | ............. H10N 30/50 310/311 |
| 2012/0302888 | A1 | 11/2012 | Dai et al. | |
| 2013/0085390 | A1 * | 4/2013 | Nishikubo | ............ B06B 1/0611 600/443 |
| 2015/0221859 | A1 * | 8/2015 | Noh | ........................ H10N 30/03 29/25.35 |
| 2017/0080255 | A1 * | 3/2017 | Law | ..................... G10K 11/346 |
| 2017/0113250 | A1 * | 4/2017 | Lee | ...................... A61B 8/4444 |
| 2017/0303893 | A1 | 10/2017 | Sato | |
| 2019/0321007 | A1 * | 10/2019 | Hakkens | ............. A61B 8/4455 |
| 2019/0328354 | A1 * | 10/2019 | Xu | ....................... H10N 30/073 |
| 2019/0348596 | A1 * | 11/2019 | Pelssers | ........... A61M 25/0158 |
| 2022/0354458 | A1 * | 11/2022 | Sato | ........................ A61B 1/06 |
| 2023/0075328 | A1 * | 3/2023 | Zemp | ................... B06B 1/0215 |
| 2024/0066554 | A1 * | 2/2024 | Stevenson | ........... H10N 30/088 |
| 2025/0114070 | A1 * | 4/2025 | Zemp | ................... B06B 1/0215 |

FOREIGN PATENT DOCUMENTS

| | | |
|---|---|---|
| JP | H03-023848 A | 1/1991 |
| JP | 2006-212076 A | 8/2006 |
| JP | 2006-255246 A | 9/2006 |
| JP | 2010-042093 A | 2/2010 |

* cited by examiner

FIG.4

ULTRASOUND PROBE AND ULTRASOUND ENDOSCOPE

CROSS-REFERENCE TO RELATED APPLICATION

This application is a continuation of International Application No. PCT/JP2020/008502, filed on Feb. 28, 2020, the entire contents of which are incorporated herein by reference.

BACKGROUND

1. Technical Field

The disclosure relates to an ultrasound probe and an ultrasound endoscope.

2. Related Art

Ultrasound probes including a plurality of ultrasound transducers that transmit and receive ultrasound have been known. An ultrasound probe is provided at a distal end of an insertion unit of an endoscope and observes the inside of a subject by ultrasound. Ultrasound that is transmitted in a sound axis direction that is a direction in which the ultrasound transducers perform observation by ultrasound is reflected in the subject and the ultrasound transducers receive the reflected ultrasound. On the other hand, ultrasound that is transmitted from the ultrasound transducers in a direction opposite to the sound axis direction is attenuated by a backing layer that is provided on surfaces of the ultrasound transducers on a side opposite to the sound axis direction and accordingly is prevented from giving an effect on the observation.

In endoscopes, it is required that the size of a distal end of an insertion unit be reduced in order to reduce strains on patients. Japanese Laid-open Patent Publication No. 2006-255246 discloses an ultrasound endoscope with an insertion unit whose distal end is reduced in size by cutting part of a backing layer.

SUMMARY

In some embodiments, an ultrasound probe includes: an ultrasound transducer array in which a plurality of ultrasound transducers configured to transmit and receive ultrasound are arrayed; a backing layer provided on a proximal end surface of the ultrasound transducer array; and a piezoelectric element, provided on a proximal end surface of the backing layer, whose direction of polarization is opposite to a direction of polarization of the plurality of ultrasound transducers.

In some embodiments, an ultrasound endoscope includes: the ultrasound probe; a distal end rigid part that is provided with the ultrasound probe; an illuminator that is inserted on an inner side with respect to the backing layer, the illuminator being configured to apply illumination light to a subject from a distal end of the distal end rigid part; an imager that is inserted on the inner side with respect to the backing layer, the imager being configured to capture an internal image of the subject from the distal end of the distal end rigid part; and a treatment tool channel that is inserted on the inner side with respect to the backing layer and via which a treatment tool is caused to protrude from the distal end of the distal end rigid part.

In some embodiments, an ultrasound probe includes: in sequence, an ultrasound transducer, a backing layer, and a piezoelectric element. The ultrasound transducer is configured to transmit and receive ultrasound, and a direction of polarization of the piezoelectric element is opposite to a direction of polarization of the ultrasound transducer.

The above and other features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 4 is a B-arrow view of the ultrasound probe illustrated in FIG. 3;

DETAILED DESCRIPTION

Figure 1:
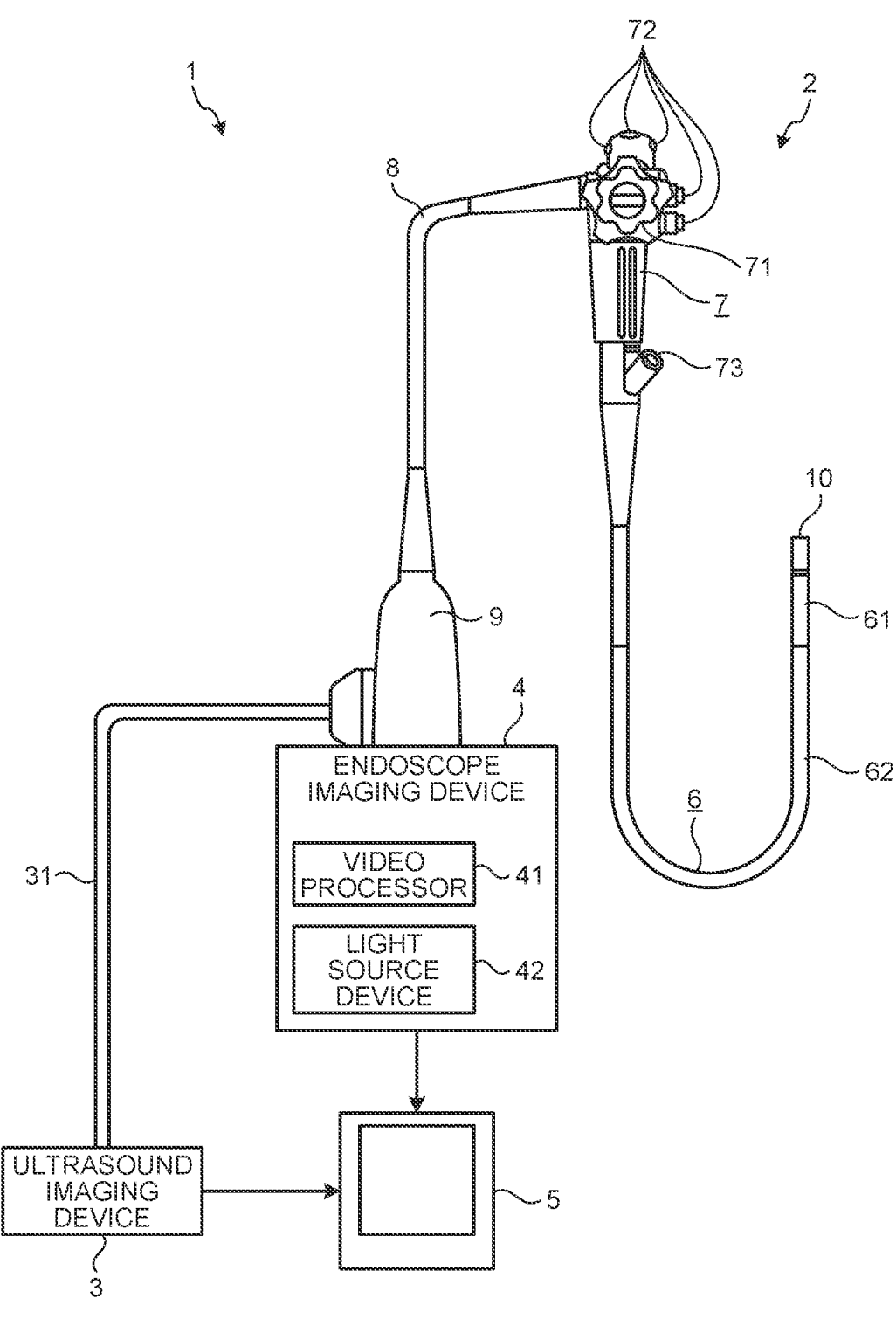
FIG. 1 is a diagram schematically illustrating an endoscope system including an ultrasound probe according to a first embodiment.

Embodiments of an ultrasound probe and an ultrasound endoscope according to the disclosure will be described below with reference to the accompanying drawings. Note that the embodiments do not limit the disclosure. The disclosure is applicable to ultrasound probes and ultrasound endoscopes generally.

In the illustration of the drawings, the same or corresponding components are denoted with the same reference numeral. The drawings are schematic and it is necessary to note that the correlation among components in size and the ratio among the components may differ from actual ones. The drawings may contain components whose correlation in size and whose ratio differ among the drawings.

First Embodiment

FIG. 1 is a diagram schematically illustrating an endoscope system including an ultrasound probe according to a first embodiment. An endoscope system 1 is a system that performs internal ultrasound observation on a subject, such as a human, using an ultrasound endoscope. As illustrated in FIG. 1, the endoscope system 1 includes an ultrasound endoscope 2, an ultrasound imaging device 3, an endoscope imaging device 4 and a display device 5.

The ultrasound endoscope 2 is partly insertable into the subject and has a function of transmitting ultrasound pulses (acoustic pulses) to an internal body wall of the subject, receiving ultrasound echoes that are reflected on the subject, and outputting an echo signal and a function of capturing an internal image of the subject and outputting an image signal. Note that a detailed configuration of the ultrasound endoscope 2 will be described below.

The ultrasound imaging device 3 is electrically connected to the ultrasound endoscope 2 via an ultrasound cable 31 (FIG. 1) and outputs a pulse signal to the ultrasound endoscope 2 via the ultrasound cable 31 and an echo signal is input to the ultrasound imaging device 3 from the ultrasound endoscope 2. The ultrasound imaging device 3 performs given processing on the echo signal and generates an ultrasound image.

An endoscope connector 9 (FIG. 1) of the ultrasound endoscope 2 to be described below is detachably connected to the endoscope imaging device 4. As illustrated in FIG. 1, the endoscope imaging device 4 includes a video processor 41 and a light source device 42.

The image signal from the ultrasound endoscope 2 is input to the video processor 41 via the endoscope connector 9. The video processor 41 performs given processing on the image signal and generates an endoscopic image.

The light source device 42 supplies illumination light that illuminates the inside of the subject to the ultrasound endoscope 2 via the endoscope connector 9.

The display device 5 is configured using liquid crystals or organic electro luminescence and displays the ultrasound image that is generated by the ultrasound imaging device 3, the endoscopic image that is generated by the endoscope imaging device 4, etc.

Configuration of Ultrasound Endoscope

A configuration of the ultrasound endoscope 2 will be described next. As illustrated in FIG. 1, the ultrasound endoscope 2 includes an insertion unit 6, an operation unit 7, a universal cord 8, and the endoscope connector 9. Note that the "distal end side" described below means the side of a distal end of the insertion unit 6 (distal end side in a direction of insertion into the subject). The "proximal end side" described below means the side separated from the distal end of the insertion unit 6 (the side of the operation unit 7).

The insertion unit 6 is a part that is inserted into the subject. As illustrated in FIG. 1, the insertion unit 6 includes an ultrasound probe 10 that transmits and receives ultrasound at a distal end part, a curve part 61 that is connected to the proximal end side of the ultrasound probe 10 and that can curve, and a flexible tube 62 that is connected to the proximal end side of the curve part 61 and that has flexibility. Note that a detailed configuration of the ultrasound probe 10 that is installed in the insertion unit 6 that is a relevant part of the disclosure will be described below.

The operation unit 7 is a part that is connected to the proximal end side of the insertion unit 6 and that receives various operations from a doctor, etc. As illustrated in FIG. 1, the operation unit 7 includes a curve knob 71 for an operation of curving the curve part 61, a plurality of operation members 72 for performing various operations, and a treatment tool insertion port 73 into which a treatment tool is inserted.

The universal cord 8 is a cord that extends from the operation unit 7 and in which a light guide that transmits illumination light that is supplied from the light source device 42, a transducer cable that transmits the above-described pulse signal and echo signal, a signal cable that transmits the image signal described above, etc., are provided.

The endoscope connector 9 is provided at an end of the universal cord 8. The ultrasound cable 31 is connected to the endoscope connector 9 and the endoscope connector 9 is inserted into the endoscope imaging device 4 and thus is connected to the video processor 41 and the light source device 42.

Configuration of Ultrasound Probe

Figure 2:
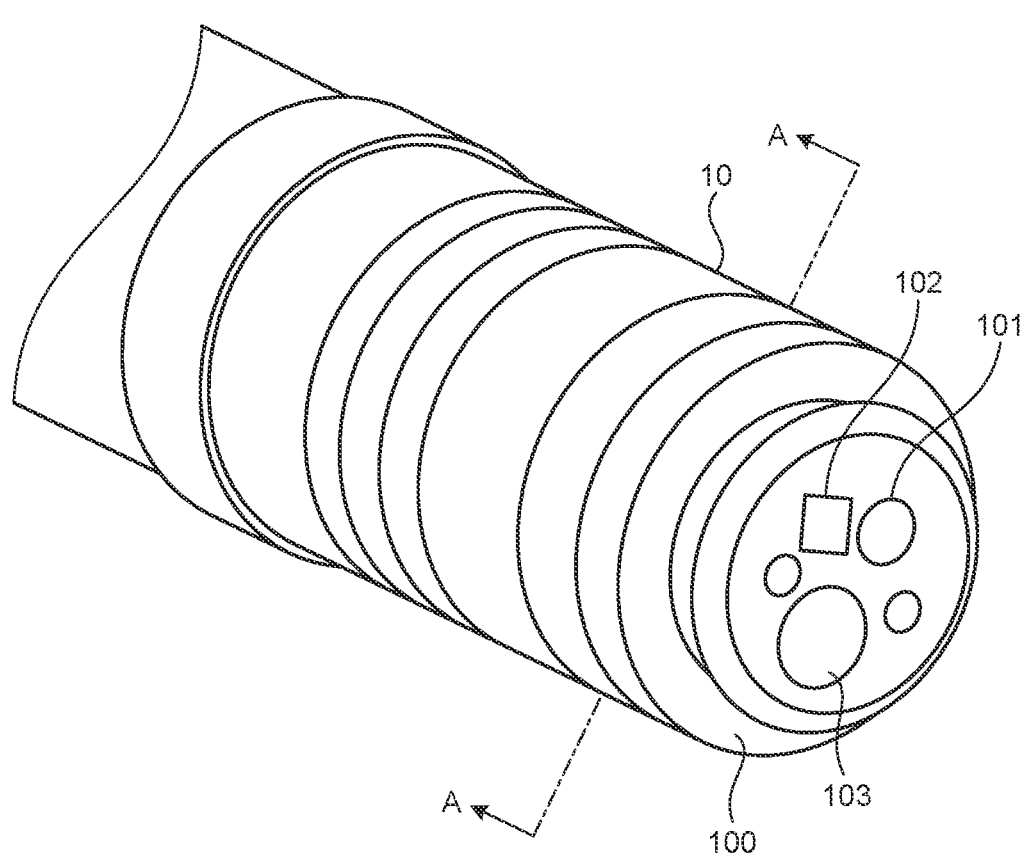
FIG. 2 is a perspective view of a distal end of an insertion unit.

A configuration of the ultrasound probe 10 will be described next. FIG. 2 is a perspective view of the distal end of the insertion unit. As illustrated in FIG. 2, the ultrasound probe 10 is an ultrasound probe whose distal end part has an electronic radial scanning system and that transmits ultrasound pulses radially. At the distal end of the insertion unit 6, a distal end rigid part 100 that is provided with the ultrasound probe 10, an illuminator 101 that applies illumination light from the light source device 42 to the subject from the distal end of the distal end rigid part 100, an imager 102 that captures an internal image of the subject from the distal end of the distal end rigid part 100, and a treatment tool channel 103 via which the treatment tool is caused to protrude from the distal end of the distal end rigid part 100 are provided.

Figure 3:
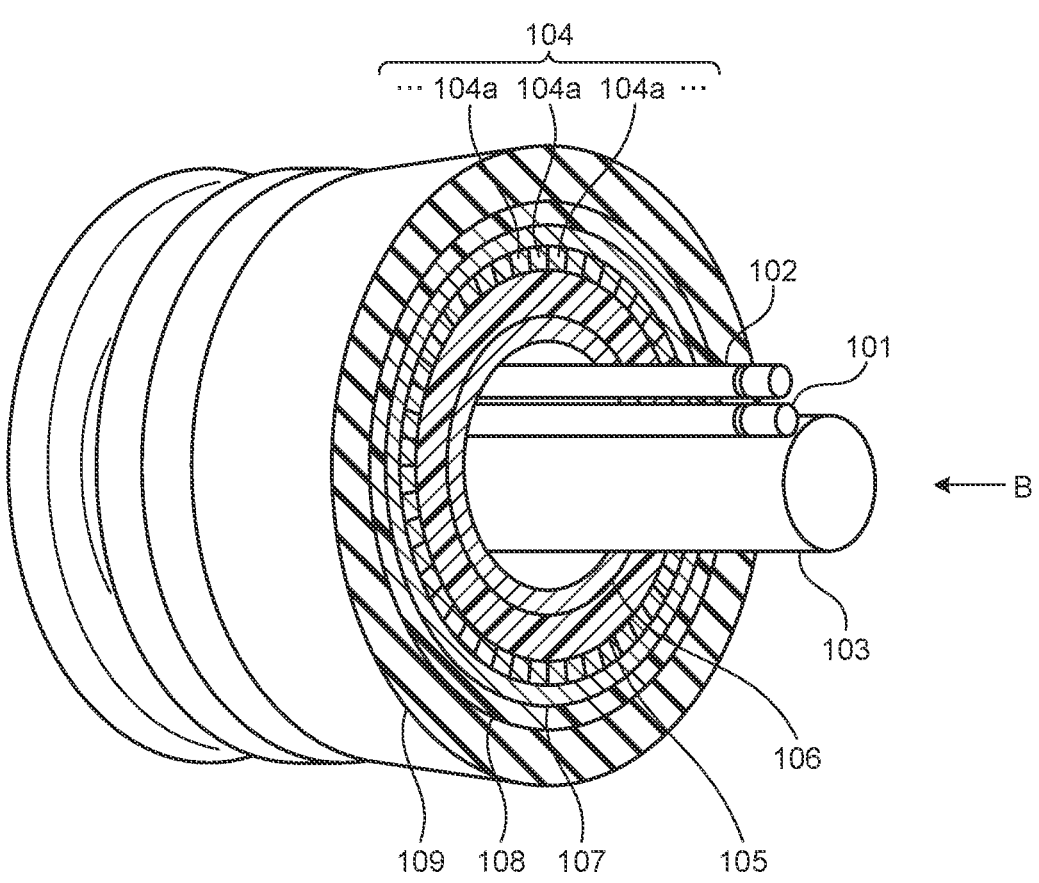
FIG. 3 is a cross-sectional view of the distal end that is cut along the line A-A in FIG. 2.

FIG. 3 is a cross-sectional view of the distal end that is cut along the line A-A in FIG. 2. As illustrated in FIG. 3, the ultrasound probe 10 includes an ultrasound transducer array 104 including a plurality of ultrasound transducers 104a, a backing layer 105 that is provided on a proximal end surface of the ultrasound transducer array 104, a piezoelectric element 106 that is provided on a proximal end surface of the backing layer 105, a first acoustic matching layer 107 that is provided on a distal end surface of the ultrasound transducer array 104, a second acoustic matching layer 108 that is provided on a distal end surface of the first acoustic matching layer 107, and an acoustic lens 109 that covers an outer circumference of the ultrasound probe 10. The illuminator 101, the imager 102 and the treatment tool channel 103 are inserted on the inner side with respect to the backing layer 105. The direction in which the ultrasound transducers 104a preform observation by ultrasound is referred to as a sound axis direction (a direction of radial extension from the center of a circle that is formed by the ultrasound transducers 104a), the surface on the distal end side in the sound axis direction is referred to as a distal end surface, and a surface on the proximal end side in the sound axis direction is referred to as a proximal end surface.

Figure 4:
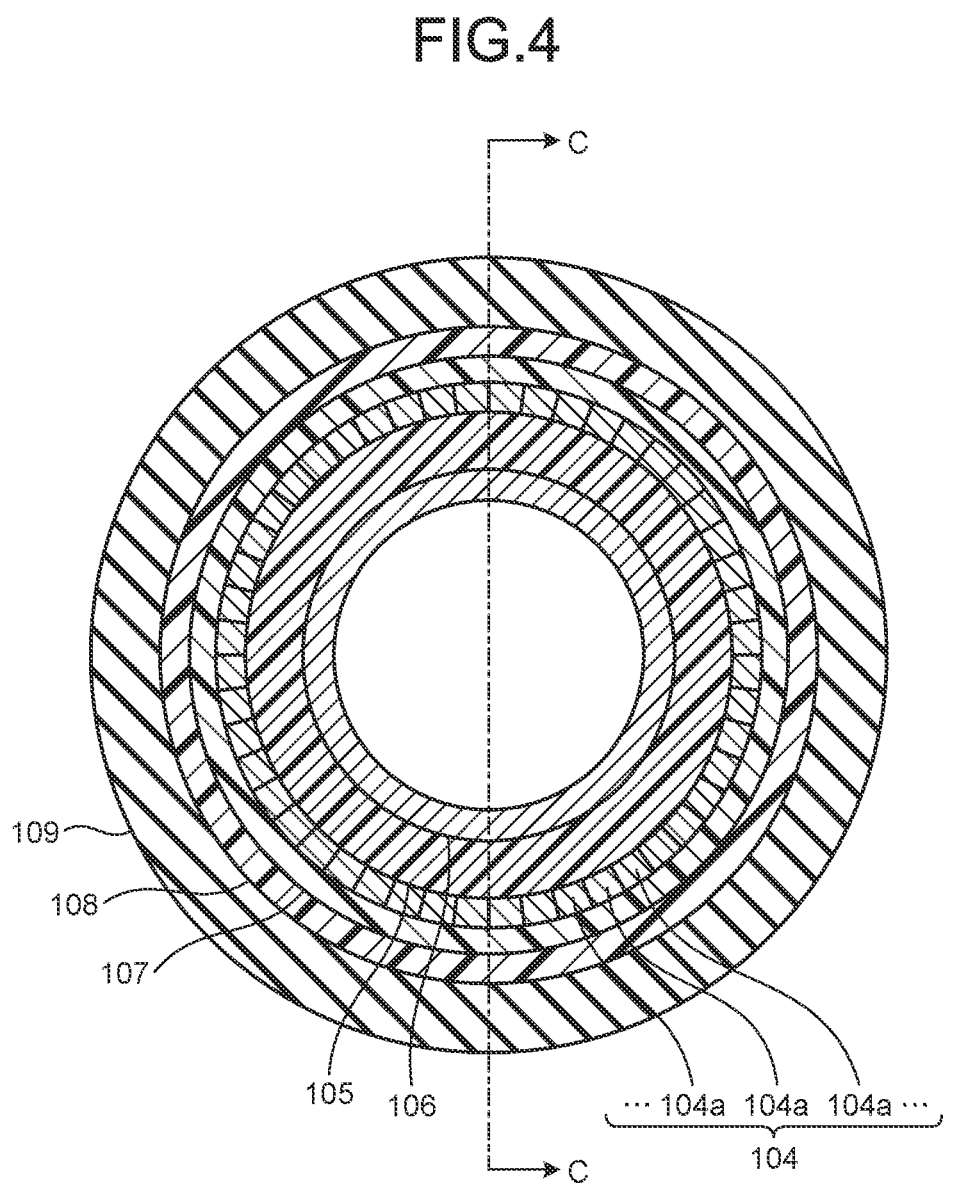
Figure 5:
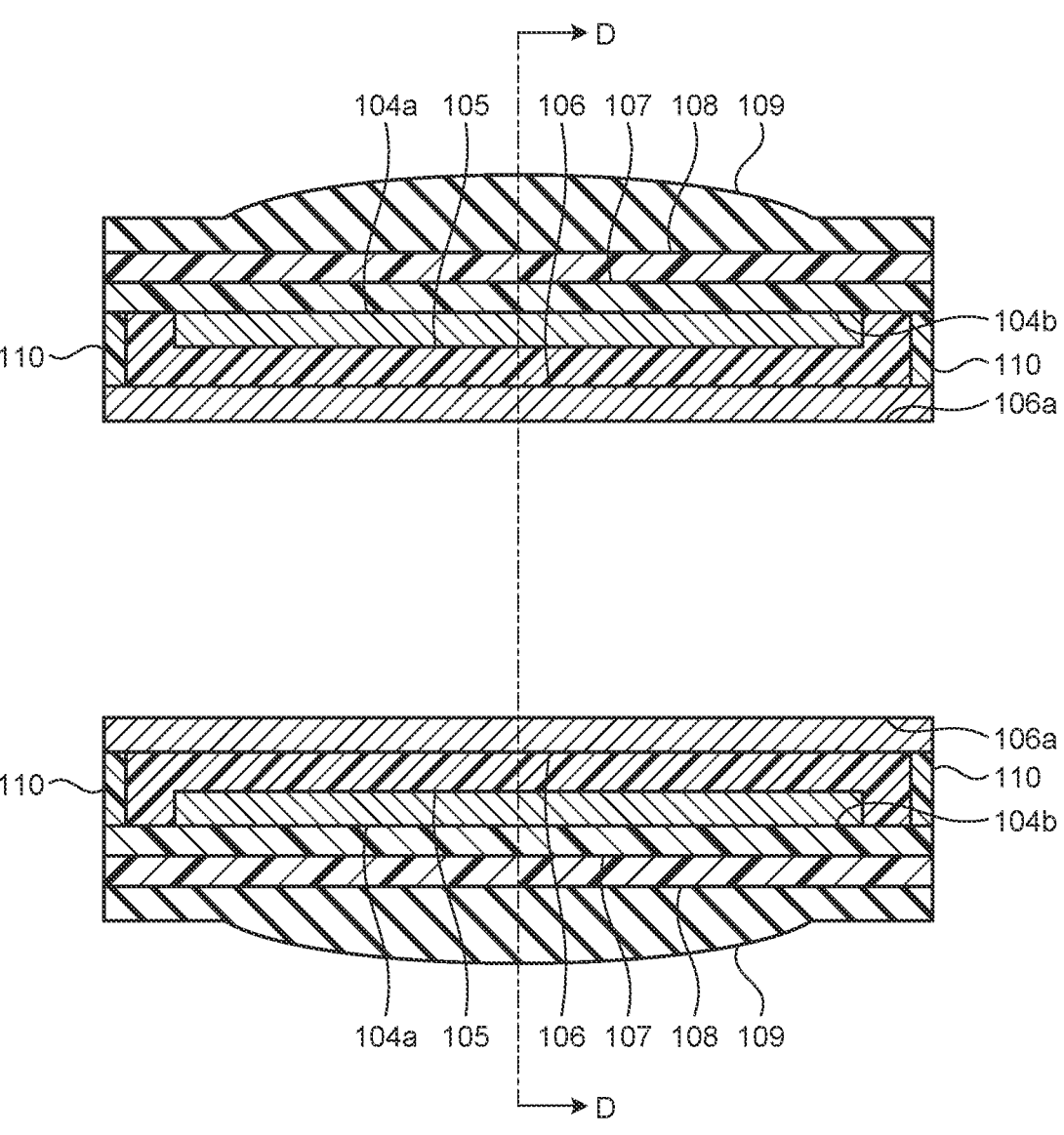
FIG. 5 is a cross-sectional view corresponding to the line C-C in FIG. 4.

FIG. 4 is a B-arrow view of the ultrasound probe illustrated in FIG. 3. FIG. 5 is a cross-sectional view corresponding to the line C-C in FIG. 4. FIG. 4 is a cross-sectional view corresponding to the line D-D in FIG. 5. As illustrated in FIG. 5, the ultrasound probe 10 includes a side board 110 that is provided on the distal end side and the proximal end side in a longitudinal direction of the insertion unit 6.

The ultrasound transducer array 104 includes the ultrasound transducers 104a that are arrayed along an arc. The ultrasound transducers 104a form a prismatic shape and are arrayed, being aligned in the longitudinal direction.

The ultrasound transducers 104a transmit and receive ultrasound under the control of the ultrasound imaging device 3. The ultrasound transducers 104a transmit ultrasound of, for example, a band width between 5 MHz and 12

MHz inclusive. At distal end surfaces of the ultrasound transducers 104*a*, a GND 104*b* to which a ground interconnect is connected is formed.

The ultrasound transducers 104*a* are formed using, for example, lead zirconate titanate (PZT). The ultrasound transducers 104*a* may be formed using a PMN-PT single crystal, a PMN-PZT single crystal, a PZN-PT single crystal, a PIN-PMN-PT single crystal, a PIN-PZN-PT single crystal, or a relaxor-based piezoelectric material. The material is not particularly limited as long as the material has piezoelectric properties. Note that the PMN-PT single crystal is an abbreviated name of a solid solution of lead magnesium niobate and lead titanate. The PMN-PZT single crystal is an abbreviated name of a solid solution of lead magnesium niobate and lead zirconate titanate. The PZN-PT single crystal is an abbreviated name of a solid solution of lead zinc niobate and lead titanate. The PIN-PMN-PT single crystal is an abbreviated name of a solid solution of lead indium niobate, lead magnesium niobate and lead titanate. The PIN-PZN-PT single crystal is an abbreviated name of a solid solution of lead indium niobate, lead zinc niobate and lead titanate. The relaxor-based piezoelectric material is a generic term of a three-component system piezoelectric material obtained by adding lead-based complex perovskite that is a relaxor material to lead titanate (PT) for the purpose of increasing the piezoelectric constant and permittivity. Lead-based complex perovskite is denoted by $Pb(B1,B2)O_3$, where B1 is any one of magnesium, zinc, indium and scandium and B2 is any one of niobium, tantalum and tungsten. These materials have excellent piezoelectric effects. For this reason, even with a size reduction, it is possible to reduce the value of electric impedance.

The backing layer 105 is provided in a cylindrical shape on the side of an inner circumference of the arc that is formed by the ultrasound transducer array 104. The backing layer 105 attenuates unnecessary ultrasound vibrations caused by operations of the ultrasound transducers 104*a*. The backing layer 105 is formed by using a material with a high rate of attenuation, for example, an epoxy resin into which fillers, such as alumina or zirconia, are dispersed or rubber into which the aforementioned fillers are dispersed. A thickness T1 of the backing layer 105 along the sound axis direction preferably satisfies T1=(½×odd number)×λ, where λ is a wavelength of ultrasound that is a resonance frequency of the piezoelectric element 106 in the backing layer 105.

The piezoelectric element 106 is provided in a cylindrical shape on the side of the inner circumference of the arc that is formed by the ultrasound transducer array 104. The piezoelectric element 106 may be continuous in a circumferential direction or may be divided into stripe forms along the circumferential direction like the ultrasound transducer array 104. The piezoelectric element 106 has a direction of polarization opposite to that of the ultrasound transducers 104*a* to attenuate vibrations of the ultrasound transducers 104*a*. The piezoelectric element 106 is formed of a piezoelectric material like the ultrasound transducers 104*a*. The piezoelectric element 106 may be formed of the same material as that of the ultrasound transducers 104*a* or may be formed of a material different from that of the ultrasound transducers 104*a*. The resonance frequency of the piezoelectric element 106 only needs to be within a band of ultrasound that the ultrasound transducers 104*a* transmit and is, for example, between 5 MHz and 12 MHz inclusive and setting the resonance frequency at a frequency on a low-frequency side of ultrasound that the ultrasound transducers 104*a* transmit makes it possible to attenuate ultrasound on the low-frequency side that does not attenuate easily. For this reason, it is more preferable that the resonance frequency be, for example, 5 MHz and an example in which the resonance frequency is 5 MHz will be described below. A thickness T2 of the piezoelectric element 106 along the sound axis direction satisfies $f_0$=N/T2, where $f_0$ is a resonance frequency of the piezoelectric element 106 and N is a frequency constant of the piezoelectric element 106. A GND 106*a* to which a ground wiring is connected is formed on a proximal end surface of the piezoelectric element 106.

In order to efficiently transmit sound (ultrasound) between the ultrasound transducer array 104 and a subject to be observed, the first acoustic matching layer 107 and the second acoustic matching layer 108 match acoustic impedances of the ultrasound transducer array 104 and the subject to be observed. The first acoustic matching layer 107 and the second acoustic matching layer 108 are made of materials that are different from each other. In the first embodiment, the ultrasound probe is described as one including the two acoustic matching layers (the first acoustic matching layer 107 and the second acoustic matching layer 108); however, depending on the properties of the ultrasound transducer array 104 and the subject to be observed, no, a single or at least three acoustic matching layers may be provided.

The acoustic lens 109 is formed using silicone, polymethylpentene, epoxy resin, polyetherimide, or the like, has a function of narrowing ultrasound using its one surface that is convex or concave, and emits ultrasound having passed through the acoustic matching layers to the outside or takes ultrasound echoes from the outside. The acoustic lens 109 can be provided freely and a configuration without the acoustic lens 109 may be employed.

The side board 110 houses the ultrasound transducers 104*a* and the backing layer 105. It is preferable that the side board 110 be separated from the ultrasound transducer array 104 so as not to transmit vibrations of the ultrasound transducers 104*a*.

Figure 6:
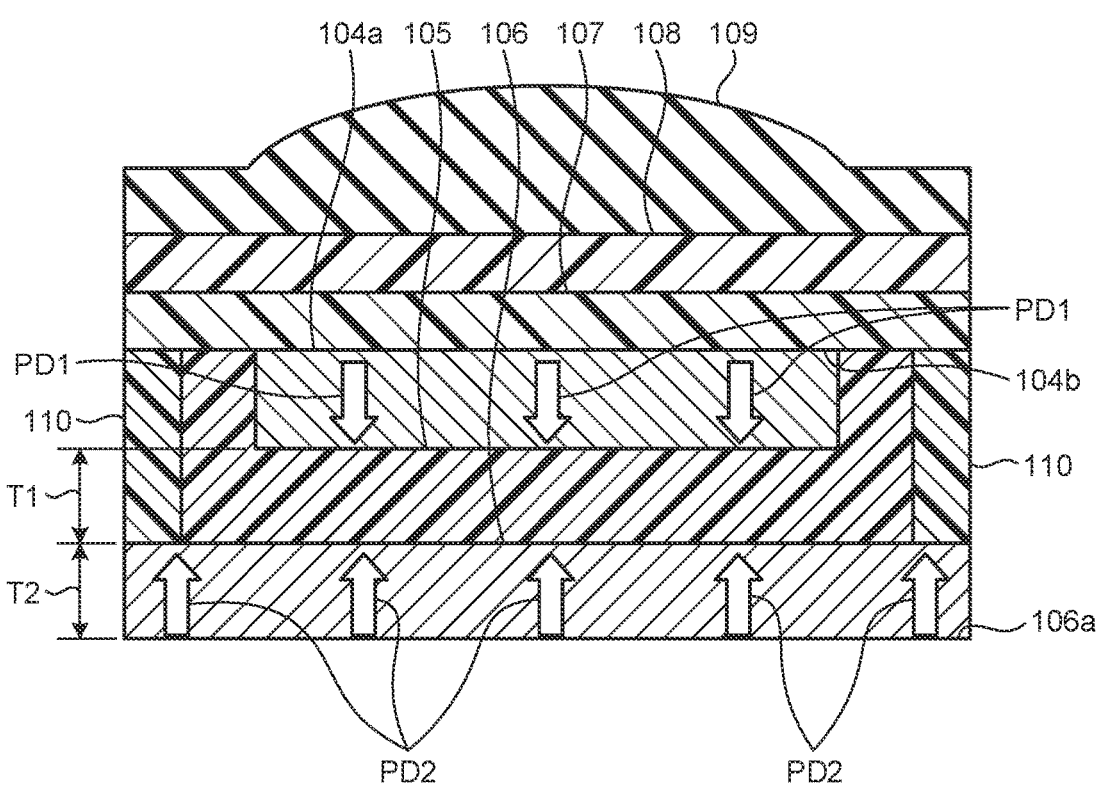
FIG. 6 is a diagram for explaining directions of polarization.

FIG. 6 is a diagram for explaining directions of polarization. The thickness T1 of the backing layer 105 in the sound axis direction illustrated in FIG. 6 satisfies T1=(½×odd number)×λ, where λ is a wavelength of ultrasound that is a resonance frequency of the piezoelectric element 106 in the backing layer 105. For example, when the speed of sound in the backing layer 105 is 1800 m/s and the resonance frequency of the piezoelectric element 106 is 5 MHz, λ/2=(1800/5000000)/2=180 μm and thus the thickness T1 of the backing layer 105 is set at 180 μm. Note that, because the speed of sound in the backing layer 105 differs depending on the material of the backing layer 105, the type of fillers, and the amount of additive, etc., it is necessary to appropriately choose the thickness T1 of the backing layer 105 according to the requirements of the backing layer 105. A sound of speed c in a medium can be represented as $c=\sqrt{(M/\rho)}$, where M is an elastic modulus of the medium and ρ is a density of the medium, and therefore the thickness T1 is selected as appropriate according to these physical property values.

The thickness T2 of the piezoelectric element 106 in the sound axis direction satisfies T2=N/$f_0$ from the above-described relation. For example, when the resonance frequency of the piezoelectric element 106 is 5 MHz and the frequency constant of the piezoelectric element 106 is 1400, the thickness T2=1400/5000000=280 μm. Note that, because the frequency constant differs depending on the material of the piezoelectric element 106, it is necessary to appropriately select the thickness T2 of the piezoelectric element 106 according to the material of the piezoelectric element 106.

A direction of polarization PD1 of the ultrasound transducers 104a and a direction of polarization PD2 of the piezoelectric element 106 are against each other. As a result, ultrasound that the ultrasound transducers 104a transmit and ultrasound that the piezoelectric element 106 transmits are in antiphase.

Figure 7:
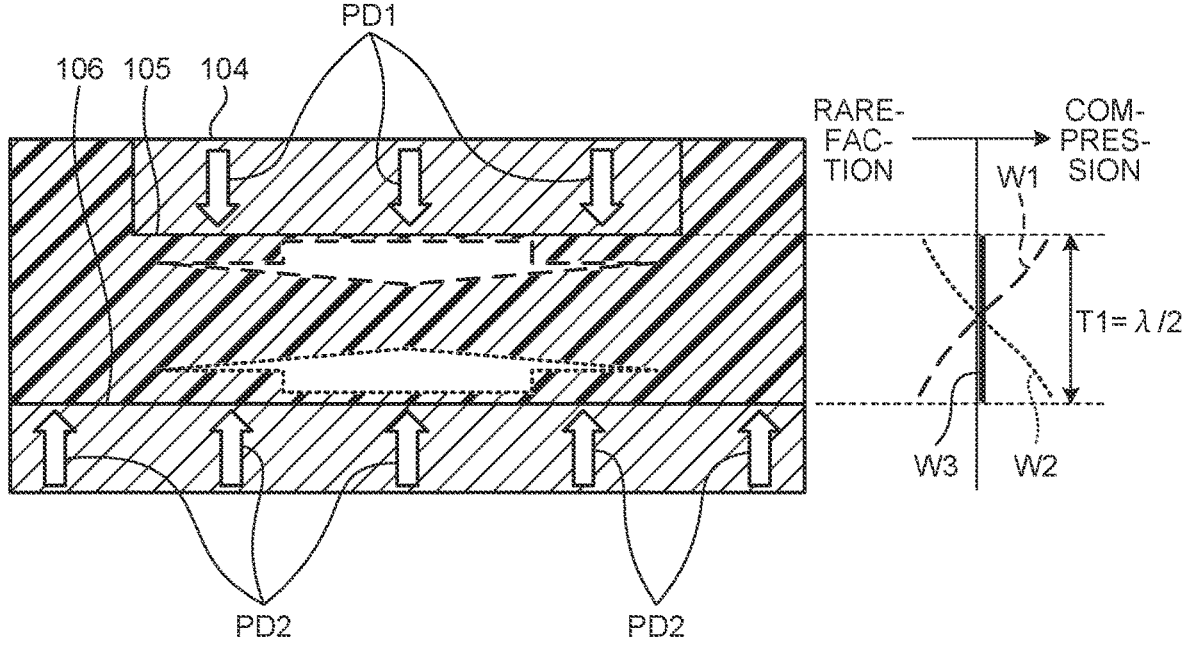
FIG. 7 is a diagram illustrating mutual cancellation of vibrations.

FIG. 7 is a diagram illustrating mutual cancellation of vibrations. As illustrated in FIG. 7, when the thickness T1 of the backing layer 105 is $\lambda/2$, ultrasound W1 that that is a component whose frequency is 5 MHz in the ultrasound that the ultrasound transducers 104a transmit and ultrasound W2 that the piezoelectric element 106 transmits and whose resonance frequency is 5 MHz cancel each other out because the ultrasound W1 and the ultrasound W2 are in antiphase and result in a resultant wave W3 (without vibration). Note that FIG. 7 illustrates the case where the thickness T1 of the backing layer 105 is $\lambda/2$ and, because cancellation occurs similarly in the case where the thickness T1 of the backing layer 105 is ($\frac{1}{2} \times$odd number)$\times\lambda$, the thickness T1 of the backing layer 105 may be set at ($\frac{1}{2} \times$odd number)$\times\lambda$.

According to the first embodiment described above, the ultrasound from the piezoelectric element 106 attenuates the ultrasound from the ultrasound transducers 104a and thus it is possible to make the backing layer 105 thin. As a result, it is possible to realize the ultrasound probe 10 whose distal end is small-sized (enabling a small diameter). When the resonance frequency of the piezoelectric element 106 is within the band of the ultrasound that the ultrasound transducers 104a transmit, an effect of attenuating the ultrasound is brought about and setting the resonance frequency at a frequency on the low-frequency side of the ultrasound that the ultrasound transducers 104a transmit makes it possible to attenuate ultrasound on the low-frequency side that does not attenuate easily.

Furthermore, according to the first embodiment, because it is possible to make the backing layer 105 thin, it is possible to increase the diameter of an inner circumferential part into which the illuminator 101, the imager 102 and the treatment tool channel 103 are inserted.

Second Embodiment

Figure 8:
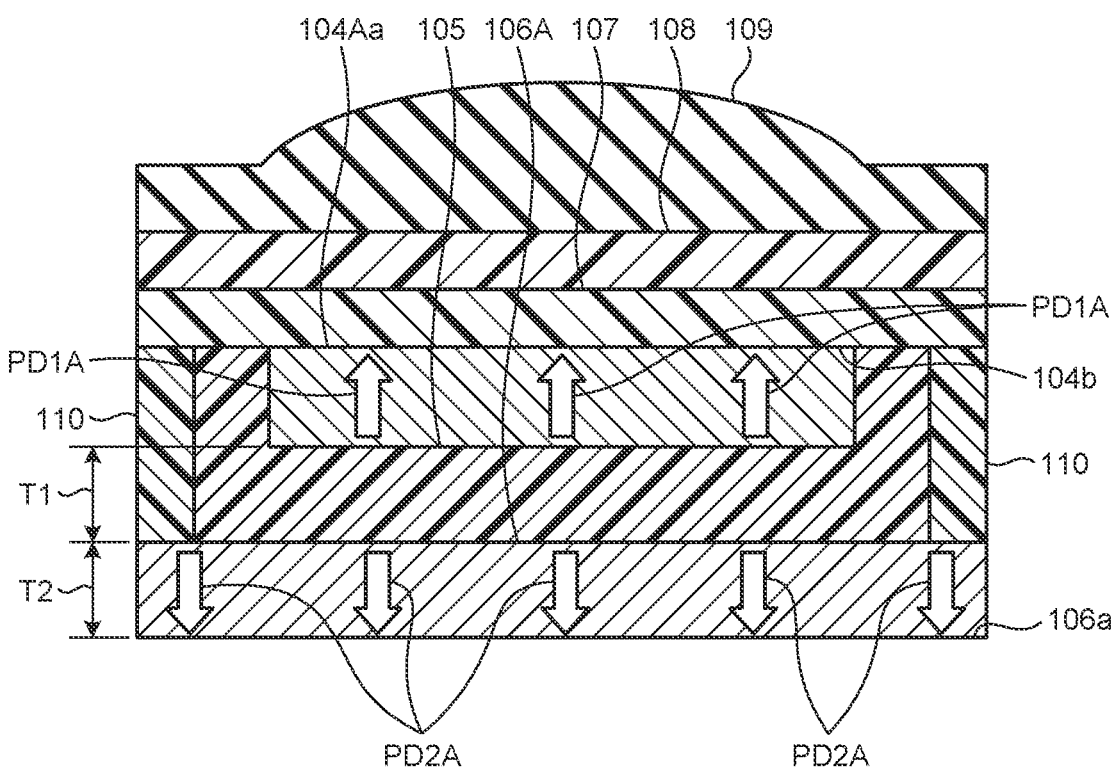
FIG. 8 is a diagram for explaining directions of polarization in an ultrasound probe according to a second embodiment.

FIG. 8 is a diagram for explaining directions of polarization in an ultrasound probe according to a second embodiment. As illustrated in FIG. 8, a direction of polarization PD1A of ultrasound transducers 104Aa is opposite to the direction of polarization PD1 of the ultrasound transducers 104a. Similarly, a direction of polarization PD2A of a piezoelectric element 106A is opposite to the direction of polarization PD2 of the piezoelectric element 106 of the first embodiment. Also in this case, similarly to the case illustrated in FIG. 7, ultrasound from the ultrasound transducers 104Aa and ultrasound from the piezoelectric element 106A cancel each other.

As described above, the directions of polarization are not limited to the directions in the first embodiment and the directions of the second embodiment may be employed. It is preferable to appropriately select directions of polarization in the ultrasound probe that is connected to the ultrasound imaging device 3 according to the waveforms of signals that the ultrasound imaging device 3 outputs.

Third Embodiment

Figure 9:
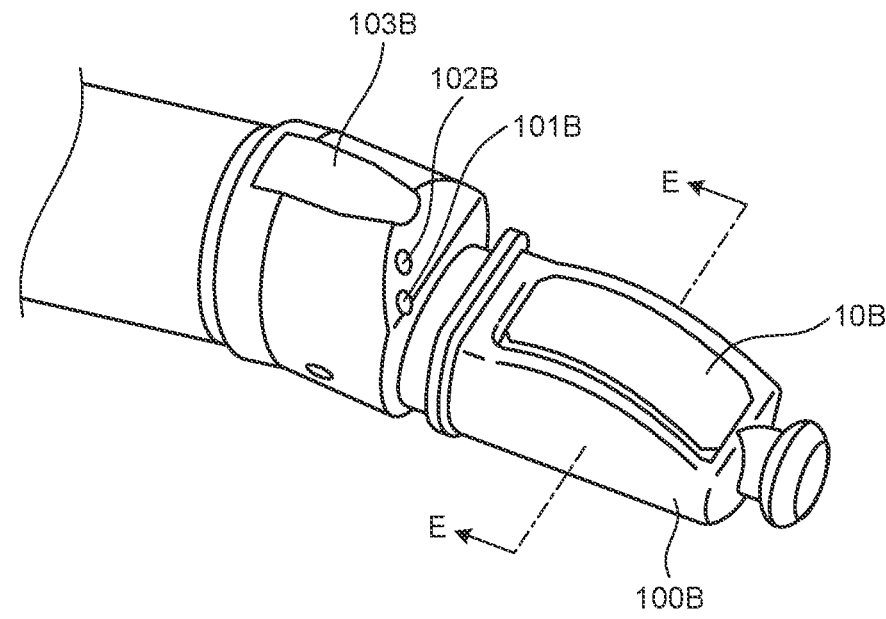
FIG. 9 is a perspective view of a distal end of an insertion unit in an endoscope system including an ultrasound probe according to a third embodiment.

FIG. 9 is a perspective view of a distal end of an insertion unit in an endoscope system including an ultrasound probe according to a third embodiment. As illustrated in FIG. 9, an ultrasound probe 10B is an ultrasound probe whose distal end part has an electronic convex scanning system and that transmits ultrasound pulses radially. At a distal end of the insertion unit 6, a distal end rigid part 100B that is provided with the ultrasound probe 10B, an illuminator 101B that applies illumination light from the light source device 42 to a subject from a distal end of the insertion unit 6, an imager 102B that captures an internal image of the subject from the distal end of the insertion unit 6, and a treatment tool channel 103B via which a treatment tool is caused to protrude from the distal end of the insertion unit 6 are provided.

Figure 10:
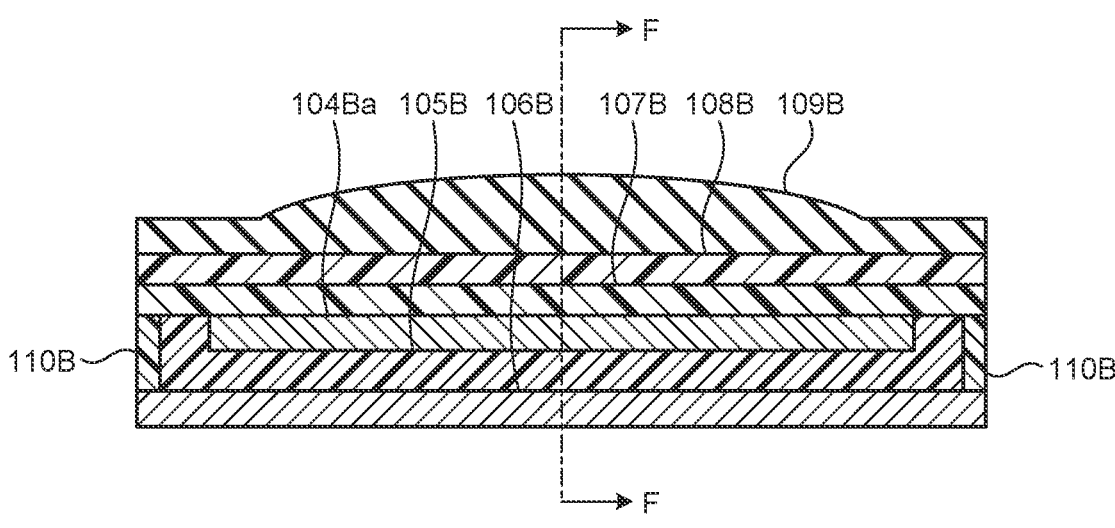
FIG. 10 is a cross-sectional view corresponding to the line E-E in FIG. 9.
Figure 11:
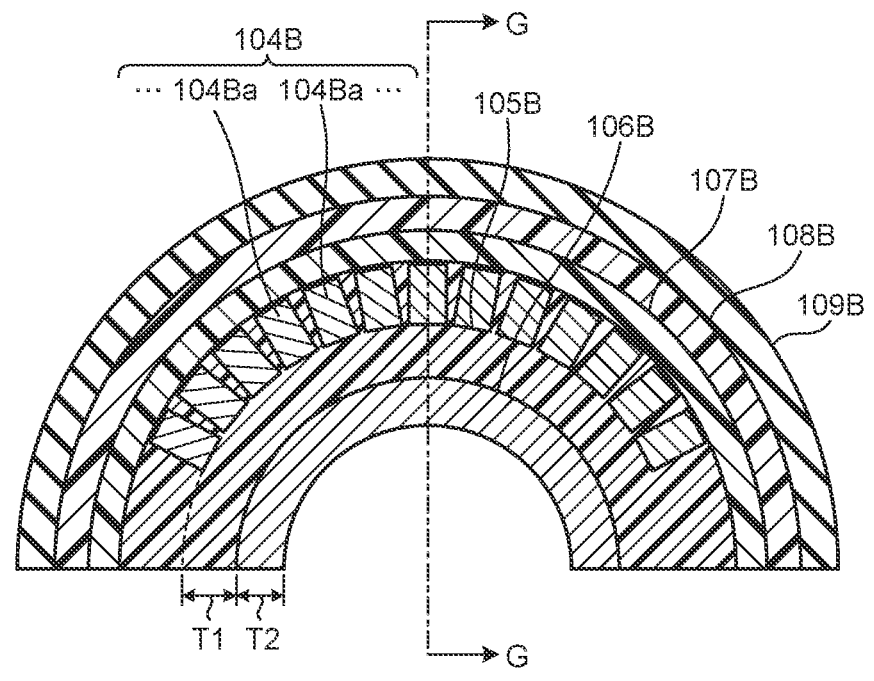
FIG. 11 is a cross-sectional view corresponding to the line F-F in FIG. 10.

FIG. 10 is a cross-sectional view corresponding to the line E-E in FIG. 9. FIG. 11 is a cross-sectional view corresponding to the line F-F in FIG. 10. FIG. 10 is a cross-sectional view corresponding to the line G-G in FIG. 10. As illustrated in FIG. 10 and FIG. 11, the ultrasound probe 10B includes an ultrasound transducer array 104B including a plurality of ultrasound transducers 104Ba, a backing layer 105B that is provided on a proximal end surface of the ultrasound transducer array 104B, a piezoelectric element 106B that is provided on a proximal end surface of the backing layer 105B, a first acoustic matching layer 107B that is provided on a distal end surface of the ultrasound transducer array 104B, a second acoustic matching layer 108B that is provided on a distal end surface of the first acoustic matching layer 107B, an acoustic lens 109B that covers an outer circumference of the ultrasound probe 10B, and a side board 110B that is provided on both ends.

The ultrasound transducer array 104B includes the ultrasound transducers 104Ba that are arrayed along part of an arc (for example, with a central angle $\theta$ of $50°\leq\theta\leq180°$). The central angle corresponds to a radiation angle at which the ultrasound probe 10B radiates ultrasound.

The backing layer 105B is provided on the side of an inner circumference of the arc that is formed by the ultrasound transducer array 104B.

The piezoelectric element 106B is provided on the side of the inner circumference of the arc that is formed by the ultrasound transducer array 104B.

The remaining configuration may be the same as that of the first embodiment and thus description thereof will be omitted.

As described above, according to the third embodiment, also in the convex-type ultrasound probe 10B, because it is possible to make the backing layer 105B thin, it is possible to realize the ultrasound probe 10B whose distal end is small-sized. Particularly in the ultrasound probe 10B with a radiation angle of 50 to 60 degrees that is used for lungs, etc., the thickness of the ultrasound probe 10B (the thickness in the vertical direction in FIG. 11) is effectively reduced.

Fourth Embodiment

Figure 12:
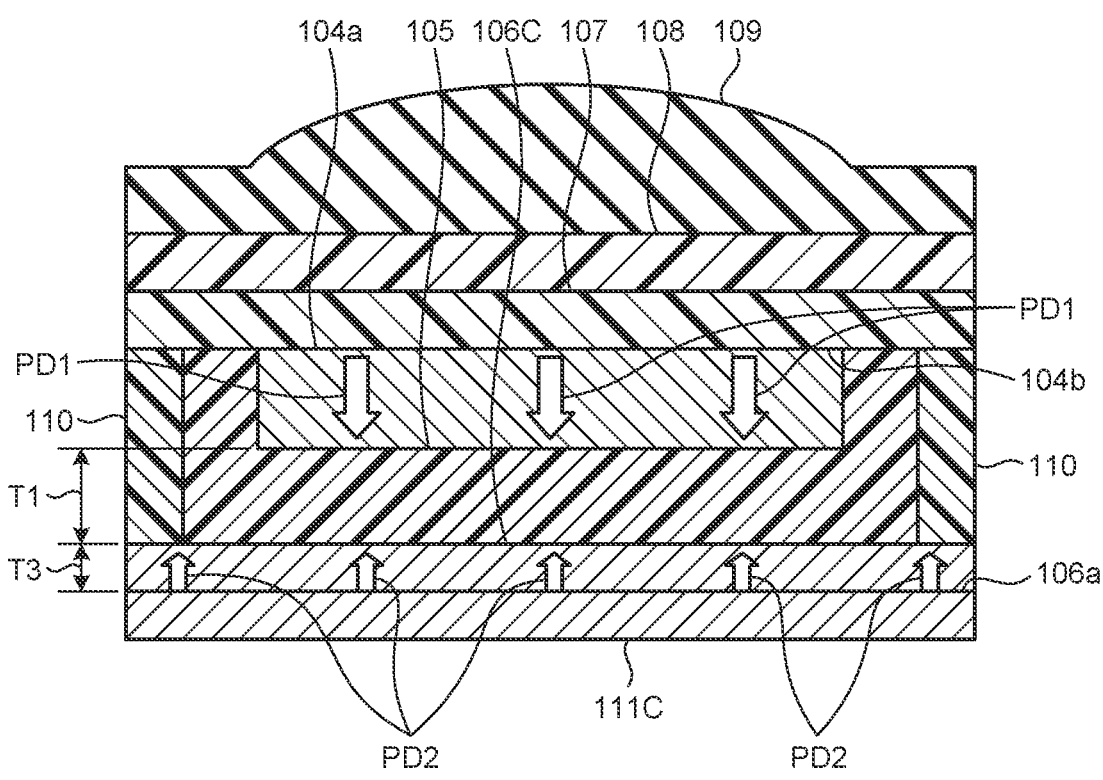
FIG. 12 is a partial cross-sectional view of an ultrasound probe according to a fourth embodiment.

FIG. 12 is a partial cross-sectional view of an ultrasound probe according to a fourth embodiment. FIG. 12 is a cross-sectional view illustrating a cross section corresponding to FIG. 6 in the first embodiment. The ultrasound probe includes a piezoelectric element 106C and a dematching layer 111C. The same components as those of the first embodiment are denoted with the same reference numerals as those of the first embodiment and description thereof will be omitted.

The piezoelectric element 106C has a direction of polarization opposite to that of the ultrasound transducers 104a to attenuate vibrations of the ultrasound transducers 104a. The resonance frequency of the piezoelectric element 106C only needs to be within a band of ultrasound that the ultrasound transducers 104a transmit and is, for example, between 5 MHz and 12 MHz inclusive and setting the resonance frequency at a frequency on a low-frequency side of ultrasound that the ultrasound transducers 104a transmit makes it possible to attenuate ultrasound on the low-frequency side that does not attenuate easily. For this reason, it is more preferable that the resonance frequency of the piezoelectric element 106C be, for example, 5 MHz and an example in which the resonance frequency is 5 MHz will be described below. A thickness T3 of the piezoelectric element 106C along the sound axis direction satisfies $f_0=N/(2\times T3)$, where $f_0$ is a resonance frequency of the piezoelectric element 106C and N is a frequency constant of the piezoelectric element 106C.

The dematching layer 111C is provided on a proximal end surface of the piezoelectric element 106C and has an acoustic impedance higher than that of the piezoelectric element 106C.

Because of provision of the dematching layer 111C on the proximal end surface of the piezoelectric element 106C, the proximal end surface of the piezoelectric element 106C serves as a fixed end to ultrasound. As a result, the thickness T3 of the piezoelectric element 106C only needs to have a thickness that is half the thickness of the first embodiment and satisfies $f_0=N/(2\times T3)$. For example, when the resonance frequency of the piezoelectric element 106C is 5 MHz and the frequency constant of the piezoelectric element 106C is 1400, the thickness $T3=1400/(2\times5000000)=140$ μm.

According to the fourth embodiment described above, provision of the dematching layer 111C enables the thickness of the piezoelectric element 106C that is half the thickness of the first embodiment and thus the distal end of the insertion unit 6 is reduced in size (the diameter is reduced) effectively. Reflection of ultrasound from the piezoelectric element 106C by the dematching layer 111C efficiently attenuates ultrasound from the ultrasound transducers 104a. Furthermore, provision of the dematching layer 111C widens the band of the piezoelectric element 106C and thus enables attenuation of ultrasound from the ultrasound transducers 104a in a wider band. Use of a rigid material for the dematching layer 111C makes it possible to increase the strength of the ultrasound probe on an inner circumferential side. Provision of the dematching layer 111C also makes it possible to prevent transmission of ultrasound from the piezoelectric element 106C to the internal configuration (the illuminator 101, the imager 102, the treatment tool channel 103, etc.).

Fifth Embodiment

Figure 13:
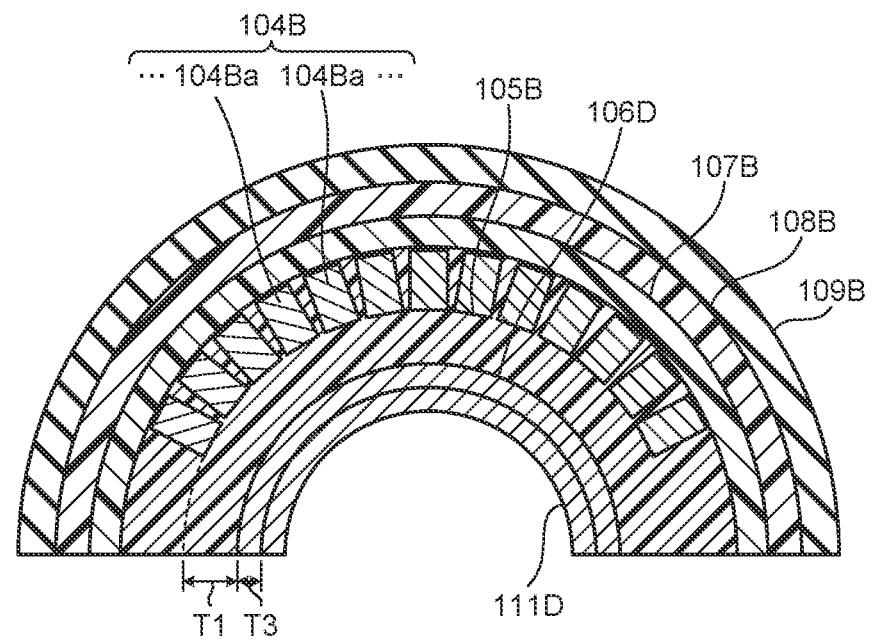
FIG. 13 is a partial cross-sectional view of an ultrasound probe according to a fifth embodiment.

FIG. 13 is a partial cross-sectional view of an ultrasound probe according to a fifth embodiment. FIG. 13 is a cross-sectional view representing a cross-section corresponding to FIG. 11 of the third embodiment. The ultrasound probe includes a piezoelectric element 106D and a dematching layer 111D. The same components as those of the third embodiment are denoted with the same reference numerals as those of the third embodiment and description thereof will be omitted.

The piezoelectric element 106D has a direction of polarization opposite to that of the ultrasound transducers 104Ba to attenuate vibrations of the ultrasound transducers 104Ba. The resonance frequency of the piezoelectric element 106D only needs to be within a band of ultrasound that the ultrasound transducers 104Ba transmit and is, for example, between 5 MHz and 12 MHz inclusive and setting the resonance frequency at a frequency on a low-frequency side of ultrasound that the ultrasound transducers 104Ba transmit makes it possible to attenuate ultrasound on the low-frequency side that does not attenuate easily. For this reason, it is more preferable that the resonance frequency of the piezoelectric element 106D be, for example, 5 MHz and, as in the fourth embodiment, the piezoelectric element 106D is formed such that $f_0=N/(2\times T3)$ is satisfied.

The dematching layer 111D is provided on a proximal end surface of the piezoelectric element 106D and has an acoustic impedance higher than that of the piezoelectric element 106D.

Because of provision of the dematching layer 111D on the proximal end surface of the piezoelectric element 106D, the proximal end surface of the piezoelectric element 106D serves as a fixed end to ultrasound. As a result, the thickness T3 of the piezoelectric element 106D only needs to have a thickness that is half the thickness of the third embodiment and satisfies $f_0=N/(2\times T3)$. For example, when the resonance frequency of the piezoelectric element 106D is 5 MHz and the frequency constant of the piezoelectric element 106D is 1400, the thickness $T3=1400/(2\times5000000)=140$ μm.

According to the fifth embodiment described above, also in the convex-type ultrasound probe 10B, providing the dematching layer 111C as in the fourth embodiment enables the thickness of the piezoelectric element 106D that is half the thickness of the third embodiment and thus the distal end of the insertion unit 6 is reduced in size (the diameter is reduced) effectively. Reflection of ultrasound from the piezoelectric element 106D by the dematching layer 111D efficiently attenuates ultrasound from the ultrasound transducers 104Ba. Furthermore, provision of the dematching layer 111D widens the band of the piezoelectric element 106D and thus enables attenuation of ultrasound from the ultrasound transducers 104Ba in a wider band. Use of a rigid material for the dematching layer 111D makes it possible to increase the strength of the ultrasound probe on an inner circumferential side. Provision of the dematching layer 111D also makes it possible to prevent transmission of ultrasound from the piezoelectric element 106D to the internal configuration (the illuminator 101, the imager 102, the treatment tool channel 103, etc.).

Sixth Embodiment

Figure 14:
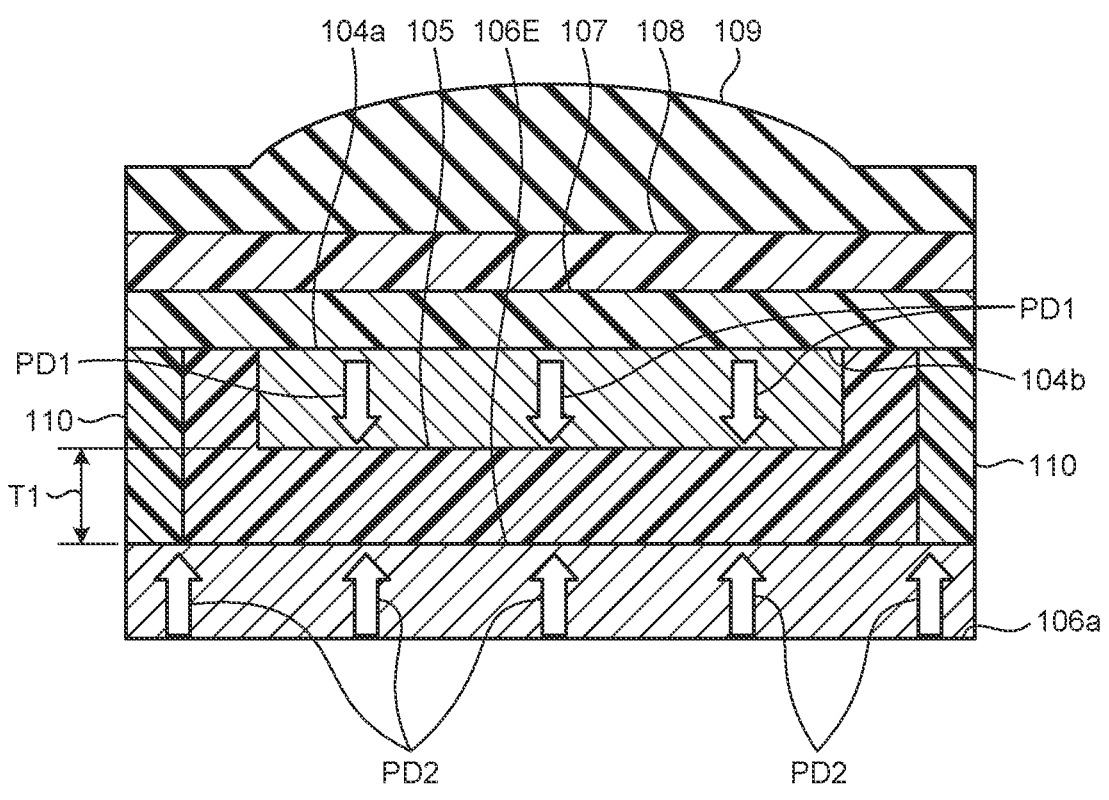
FIG. 14 is a partial cross-sectional view of an ultrasound probe according to a sixth embodiment.

FIG. 14 is a partial cross-sectional view of an ultrasound probe according to a sixth embodiment. FIG. 14 is a cross-sectional view representing a cross-section corresponding to FIG. 6 of the first embodiment. The ultrasound probe includes a piezoelectric element 106E. The same components as those of the first embodiment are denoted with the same reference numerals as those of the first embodiment and description thereof will be omitted.

The piezoelectric element 106E is formed of a polymer piezoelectric element, such as PVDF (PolyVinylidene DiFluoride) and is bendable. As a result, after layers forming the ultrasound probe are layered on a plane, it is possible to form a shape of a radial type or a convex type easily by rolling the layered structure.

In the above-described embodiments, examples of the radial type or the convex type have been described; however, the disclosure may be applied to a liner type. Also in the case of the linear type, forming a piezoelectric element makes it possible to thin the backing layer and reduce the size (reduce the thickness) of the ultrasound probe.

According to the disclosure, it is possible to realize an ultrasound probe whose distal end is reduced in size and an ultrasound endoscope.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An ultrasound probe comprising:

a piezoelectric element made of a piezoelectric material;

a backing layer configured to attenuate an ultrasound vibration;

an ultrasound transducer array arranged to face the backing layer, the ultrasound transducer array configured to transmit and receive ultrasound, a direction of polarization of the piezoelectric element being opposite to a direction of polarization of a plurality of ultrasound transducers of the ultrasound transducer array;

a first acoustic matching layer arranged to face the ultrasound transducer array;

a second acoustic matching layer arranged to face the first acoustic matching layer; and an acoustic lens configured to emit and receive the ultrasound, wherein the piezoelectric element, the backing layer, the ultrasound transducer array, the first acoustic matching layer, the second acoustic matching layer, and the acoustic lens being arranged in this order from a proximal end side of the ultrasound probe toward a distal end side of the ultrasound probe in a sound axis direction that is a direction of observation by the ultrasound.

2. The ultrasound probe according to claim 1, wherein a proximal end surface of the ultrasound transducer array and a proximal end surface of the backing layer are surfaces on a side opposite to the sound axis direction.

3. The ultrasound probe according to claim 2, wherein the plurality of ultrasound transducers are arrayed along an arc, and the backing layer is provided on a side of an inner circumference of the arc.

4. The ultrasound probe according to claim 2, wherein the plurality of ultrasound transducers are arrayed along a circumference, and the backing layer is provided in a cylindrical shape on an inner side of the circumference.

5. The ultrasound probe according to claim 1, wherein the piezoelectric element has a resonance frequency between 5 MHz and 12 MHz inclusive.

6. The ultrasound probe according to claim 1, wherein the backing layer has a thickness T1 in the sound axis direction and that satisfies $T1=(\frac{1}{2}\times odd\ number)\times\lambda$, where $\lambda$ is a wavelength of ultrasound that is a resonance frequency of the piezoelectric element in the backing layer, and the piezoelectric element has a thickness T2 in the sound axis direction and that satisfies $f_0=N/T2$, where $f_0$ is a resonance frequency of the piezoelectric element and N is a frequency constant of the piezoelectric element.

7. The ultrasound probe according to claim 1, further comprising a dematching layer that is provided on a proximal end surface of the piezoelectric element and that has an acoustic impedance higher than an acoustic impedance of the piezoelectric element.

8. The ultrasound probe according to claim 7, wherein the backing layer has a thickness T1 in the sound axis direction and that satisfies $T1=(\frac{1}{2}\times odd\ number)\times\lambda$, where $\lambda$ is a wavelength of ultrasound that is a resonance frequency of the piezoelectric element in the backing layer, and the piezoelectric element has a thickness T3 in the sound axis direction and that satisfies $f_0=N/(2\times T3)$, where $f_0$ is a resonance frequency of the piezoelectric element and N is a frequency constant of the piezoelectric element.

9. An ultrasound endoscope comprising:

the ultrasound probe according to claim 1;

a distal end rigid part that is provided with the ultrasound probe;

an illuminator that is inserted on an inner side with respect to the backing layer, the illuminator being configured to apply illumination light to a subject from a distal end of the distal end rigid part;

an imager that is inserted on the inner side with respect to the backing layer, the imager being configured to capture an internal image of the subject from the distal end of the distal end rigid part;

and a treatment tool channel that is inserted on the inner side with respect to the backing layer and via which a treatment tool is caused to protrude from the distal end of the distal end rigid part.

10. The ultrasound probe according to claim 1, wherein the piezoelectric element has a resonance frequency on a low-frequency side in a frequency band in which the ultrasound transducer array enables oscillation.

11. The ultrasound probe according to claim 1, wherein the piezoelectric element is formed of a same piezoelectric material as piezoelectric materials of the plurality of ultrasound transducers.

12. The ultrasound probe according to claim 1, wherein the piezoelectric element is formed of a plurality of piezoelectric materials that are formed in stripe forms, and the plurality of piezoelectric materials are arrayed in a same direction as a direction in which the ultrasound transducers are arrayed.

13. The ultrasound probe according to claim 1, wherein the piezoelectric element is formed of a polymer material.

14. The ultrasound probe according to claim 13, wherein the polymer material is polyvinylidene difluoride (PVDF).

15. The ultrasound probe according to claim 1, wherein the first acoustic matching layer and the second acoustic matching layer are made of materials that are different from each other.

* * * * *